Figure 3:
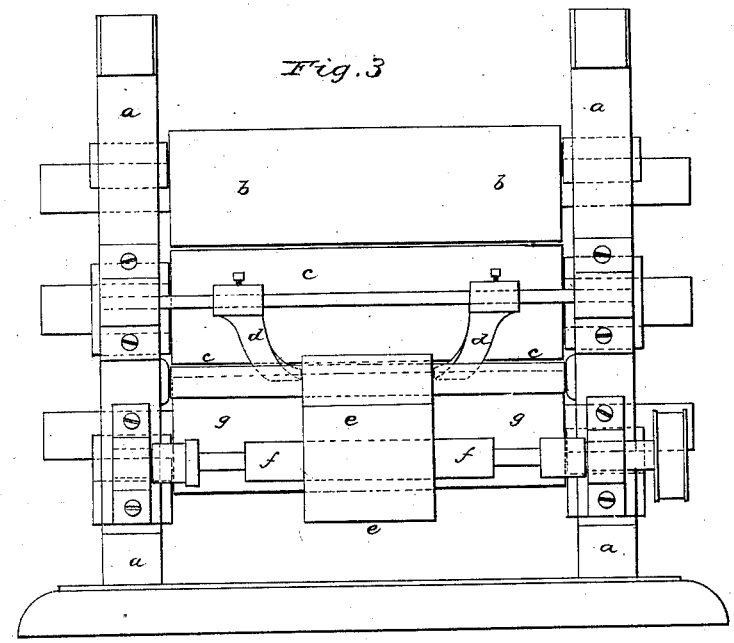

T. J. Mayall,
Belting Machine,
Nº 27,060. Fig. 1. Patented Feb. 7, 1860.
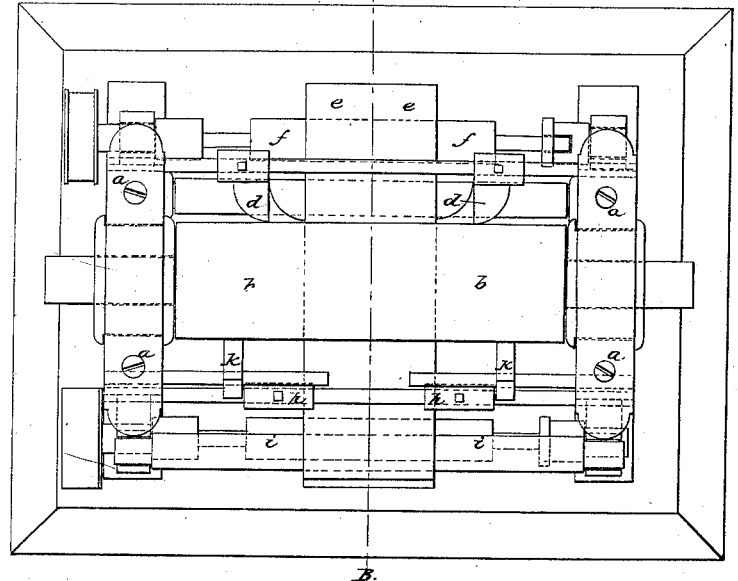
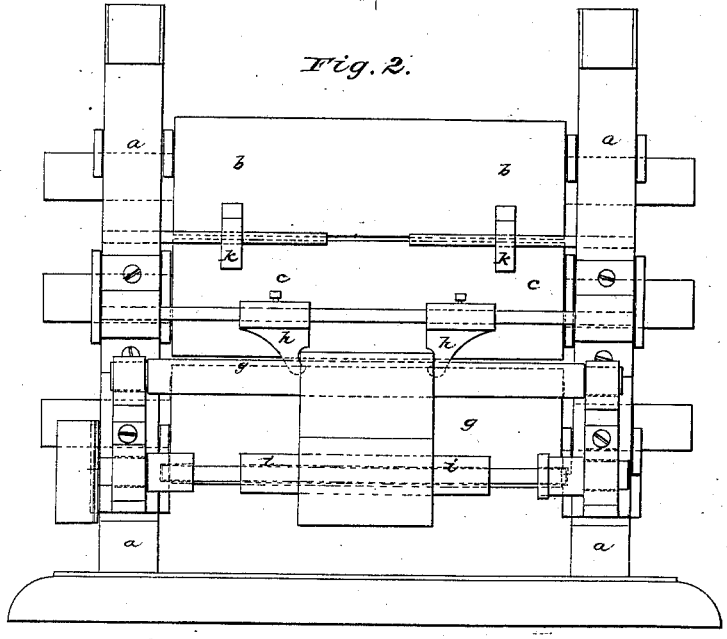
Witnesses: Inventor:

Sheet 2-2 Sheets.

T. J. Mayall,
Belting Machine,
Nº 27,060. Patented Feb. 7, 1860.

Witnesses:
Robt L Harris
Albert W Brown

Inventor.
Thos J Mayall

N. PETERS, PHOTO-LITHOGRAPHER, WASHINGTON, D. C.

UNITED STATES PATENT OFFICE.

THOMAS J. MAYALL, OF ROXBURY, MASSACHUSETTS.

MACHINE-BELTING.

Specification of Letters Patent No. 27,060, dated February 7, 1860.

*To all whom it may concern:*

Be it known that I, THOMAS J. MAYALL, of Roxbury, in the county of Norfolk and State of Massachusetts, have invented certain new and useful Improvements in Machine-Belting, and that the following description, taken in connection with the accompanying drawings hereinafter referred to, forms a full and exact specification of the same, wherein I have set forth the nature and principles of my improvements by which my invention may be distinguished from all others of a similar class, together with such parts as I claim and desire to have secured to me by Letters Patent.

Indian rubber or gutta percha machine belting is made usually from strips of the ordinary cotton sail duck, covered with a coat of india rubber, or gutta percha and then folded together. The outside of the belt is covered with a thicker coat of rubber, or gutta percha, the seam is covered by another narrow strip of rubber or gutta percha, and the whole is then vulcanized in the ordinary process of vulcanization. When greater strength is required, additional strips of duck are added, until the desired strength is obtained. This process occasions many defects in the belt, and is expensive in the manufacture. There is a great expense in covering each strip of the belt with a coat of rubber. This acts as a cement only to make the several plies adhere together and the rubber being a costly material, adds very much to the price of the belt. In manufacturing, it is almost impossible to prevent air from being confined between the strips or plies, and under the heat used in vulcanizing, the air expands, and makes large air bubbles in the belt, which injures it very materially. To obviate these difficulties, I prepare my improved belts in a different manner. I take for the center of the belt, a thick cotton fabric woven of the intended width of the belt, and of different thicknesses according to the required strength of the belt; for some small sizes, a fabric of the ordinary thickness of cotton duck, will suffice, as it is much stronger on account of the two selvages; for belts requiring greater strength, I use a thicker material; and for the strongest, I use an article, woven expressly for cotton belts, having a great thickness. Both sides or surfaces of the belt, I then cover with any composition of vulcanized india rubber or gutta percha by grinding or driving it into the surfaces by means of heavy and powerful rolls, such as are used in rubber factories. It is better that this composition should be driven in with great force as it adheres more perfectly to the belt. It is much more difficult to cover the edges than it is to cover the sides. In the ordinary belt this is not difficult, as the duck is coated in a sheet, and then folded up, the seam being in the center and thus the edges are perfectly formed and covered. To coat the edges of my improved belt, which is a very important step, in the manufacture, I have been obliged to invent a machine, which I will proceed to describe.

Figure 4:
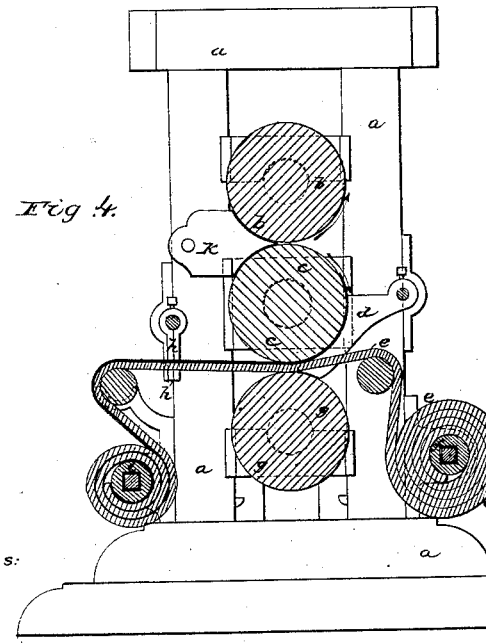

In the accompanying plate of drawings, Figure 1 is a plan or top view of my machine for making my new belting. Figs. 2 and 3 are side elevations of the same. Fig. 4 is a transverse vertical section of the same, taken in the plane of the line A, B, Fig. 1.

$a$ $a$ $a$ in the drawings represent the supporting framework of the machine.

$b$, $c$ are large pressure rolls revolving in opposite directions, as shown by arrows in Fig. 4, between which the rubber or gutta percha in a soft and tolerably thick mass, is fed and rolled into a sheet; thence passing partially around the lower pressure roller $c$ until the edges of the sheet come in contact with the sharp edges of two curved inclined formers $d$ $d$ which cut off the superfluous width of the sheet, and by means of their curved inclined edges press the rubber or gutta percha compactly on the edges of a sheet of cotton duck $e$ $e$, fed from a supply roll $f$, and passing between the pressure roll $c$ and a lower roll $g$, the surface of the duck at the same time having the rubber or gutta percha ground and driven into it, by the action of the pressure roll $c$.

$h$ $h$ are two adjustable slides which then act upon the rubber or gutta percha and the edges of the belt and press and smooth it, evenly upon the same in such a manner as to form true and perfect edges to the belt, which then is wound upon a mandrel $i$.

$k$ $k$ are adjustable guides which regulate the width of the sheet of rubber or gutta percha to be formed by the pressure rolls $b$ and $c$. It will be seen that the other side of the duck can be coated in a manner precisely similar by passing it again through the machine. The belt being formed, and covered with rubber, I then vulcanize it in any ordinary manner, but I prefer the process of vulcanizing it in sheets of flexible metal, invented by Dennis C. Gately. I sometimes put over the belt an additional cover of rubber composition, which is cut out of double the intended width of the belt and then folded over the belt, by hand, or by a machine which I have invented and which is the subject of an application for separate Letters Patent.

I have described the manufacture of a belt with cloth surfaces covered with gutta percha or india rubber; the belts can be made with one side only thus covered but the belt is not so valuable. I have described the belts as made with a cotton fabric, as that is the cheapest and most useful, but flax, or linen or other woven fabrics may be substituted. I have described the strip made with two selvages, as this is the best, but the strip can be cut with a single selvage or without any selvage, the great object of my invention being to produce a solid fabric, in which the woven strip or duck, covered with rubber is in one ply, or strip, and not in several strips, or folded, and therefore is more economical and has the other advantages above specified, and also is not in danger of splitting on becoming separated, as it is used. The mode of making up the belt and covering may be varied.

Having thus described my improvement in machine belting so that it may be distinguished from all others heretofore used and known, I would observe that I do not in this Letters Patent claim the machine or apparatus for making the belt, but

What I do claim as a new article of manufacture, is—

Machine belting made substantially in the manner and for the purposes above described with a friction surface formed partly or wholly of india rubber or gutta percha while the cotton or other fabric which is thus covered is in a single sheet or ply and free from interposed rubber or other cement.

THOS. J. MAYALL.

Witnesses:
 ROB'T L. HARRIS,
 ALBERT W. BROWN.